(12) United States Patent
Iwasa (10) Patent No.: US 9,934,761 B2
(45) Date of Patent: Apr. 3, 2018

(54) LIQUID CRYSTAL DISPLAY DEVICE

(71) Applicant: JVC KENWOOD Corporation, Yokohama-shi (JP)

(72) Inventor: Takayuki Iwasa, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/182,997

(22) Filed: Jun. 15, 2016

(65) Prior Publication Data

US 2016/0300552 A1   Oct. 13, 2016

Related U.S. Application Data

(63) Continuation of application No. 14/261,084, filed on Apr. 24, 2014, which is a continuation of application No. PCT/JP2012/076135, filed on Oct. 9, 2012.

(30) Foreign Application Priority Data

Oct. 27, 2011   (JP) ................................ 2011-235811

(51) Int. Cl.
  *G06F 3/038*   (2013.01)
  *G09G 5/00*    (2006.01)
  (Continued)

(52) U.S. Cl.
  CPC ........... *G09G 5/399* (2013.01); *G02F 1/1339* (2013.01); *G02F 1/1368* (2013.01);
  (Continued)

(58) Field of Classification Search
  CPC ......... G09G 2330/021; G09G 2360/16; G09G 3/3233; G09G 2320/043
  See application file for complete search history.

(56) References Cited

U.S. PATENT DOCUMENTS 6,128,215 A   10/2000   Lee
6,288,712 B1   9/2001   Pinkham et al.
(Continued)

FOREIGN PATENT DOCUMENTS

CN   1606770 A   4/2005
CN   1822076 A   8/2006
(Continued)

OTHER PUBLICATIONS

International Search Report and Written Opinion in PCT International Application No. PCT/JP2012/076135, dated Jan. 22, 2013.
(Continued)

*Primary Examiner* — Nan-Ying Yang
(74) *Attorney, Agent, or Firm* — Venable LLP; Michael A. Sartori; Miguel A. Lopez (57) ABSTRACT

Provided is a liquid crystal display device that includes pixels and a pixel control unit. Each pixel individually includes: a display element; a first switching unit configured to sample subframe data; a first signal holding unit configured to form a static random access memory to store the subframe data; a second switching unit configured to output the subframe data stored; and a second signal holding unit configured to form a dynamic random access memory to apply output data to the pixel electrode. The pixel control unit performs, for individual subframes, operations of: after writing into all of the plurality of pixels by repeatedly writing the subframe data to the first signal holding unit for the individual pixels in units of rows; turning on the second switching units; and rewriting stored content in the second signal holding units with the subframe data stored in the first signal holding unit.

2 Claims, 6 Drawing Sheets

(51) Int. Cl.

| | | |
|---|---|---|
| *G09G 3/36* | (2006.01) | |
| *G09G 5/10* | (2006.01) | |
| *G09G 5/399* | (2006.01) | |
| *G02F 1/1362* | (2006.01) | |
| *G02F 1/1339* | (2006.01) | |
| *G02F 1/1368* | (2006.01) | |
| *G09G 3/20* | (2006.01) | |

(52) U.S. Cl.
CPC .... *G02F 1/13624* (2013.01); *G02F 1/136213* (2013.01); *G02F 1/136286* (2013.01); *G09G 3/2022* (2013.01); *G09G 3/3648* (2013.01); *G09G 3/3659* (2013.01); *G09G 2300/0814* (2013.01); *G09G 2300/0857* (2013.01); *G09G 2300/0861* (2013.01); *G09G 2310/0286* (2013.01); *G09G 2310/08* (2013.01); *G09G 2320/0271* (2013.01)

(56) References Cited

U.S. PATENT DOCUMENTS

| | | | |
|---|---|---|---|
| 2001/0040566 A1 | 11/2001 | Pinkham et al. | |
| 2002/0024054 A1* | 2/2002 | Koyama | G09G 3/3266 257/84 |
| 2003/0095087 A1* | 5/2003 | Libsch | G09G 3/3233 345/82 |
| 2004/0196235 A1 | 10/2004 | Koyama et al. | |
| 2004/0263939 A1 | 12/2004 | Yano | |
| 2006/0181497 A1* | 8/2006 | Edo | G09G 3/3648 345/92 |
| 2008/0191989 A1 | 8/2008 | Lee et al. | |
| 2009/0096947 A1* | 4/2009 | Teranishi | G02F 1/13306 349/38 |

FOREIGN PATENT DOCUMENTS

| | | |
|---|---|---|
| CN | 101241282 A | 8/2008 |
| JP | H11-134865 A | 5/1999 |
| JP | 2001-201698 A | 7/2001 |
| JP | 2001-523847 A | 11/2001 |
| JP | 2003-157060 A | 5/2003 |
| JP | 2004-309669 A | 11/2004 |
| JP | 2008-197647 A | 8/2008 |
| JP | 2009-098234 A | 5/2009 |

OTHER PUBLICATIONS

Office Action in Japanese Patent Application No. 2011-235811, dated Oct. 7, 2014.

Office Action in Japanese Patent Application No. 2011-235811, dated Jan. 6, 2015.

Office Action in Chinese Patent Application No. 201280052812.X, dated Dec. 18, 2015.

* cited by examiner

LIQUID CRYSTAL DISPLAY DEVICE

CROSS-REFERENCE TO RELATED APPLICATIONS

This application is a Continuation of U.S. patent application Ser. No. 14/261,084, filed Apr. 24, 2014, which is a continuation of PCT international application Ser. No. PCT/JP2012/076135 filed on Oct. 9, 2012 which designates the United States, incorporated herein by reference, and which claims the benefit of priority from Japanese Patent Applications No. 2011-235811 filed on Oct. 27, 2011, incorporated herein by reference.

BACKGROUND OF THE INVENTION

1. Field of the Invention

The present invention relates to a liquid crystal display device, and more particularly to a liquid crystal display device that performs gradation display using the combination of a plurality of subframes according to gradation levels expressed by a plurality of bits.

2. Description of the Related Art

Heretofore, a subframe driving method is known as one of halftone display methods in liquid crystal display devices. In a subframe driving method which is one type of time base modulation methods, a predetermined period (one frame that is a unit for display of one image in the case of moving pictures, for example) is divided into a plurality of subframes, and pixels are driven in a combination of subframes according to a gradation to be displayed. The gradation to be displayed is determined according to the ratio of a pixel drive period occupied in a predetermined period, and this ratio is specified by the combination of subframes.

In the liquid crystal display devices according to this subframe driving method, one is known in which pixels are individually configured of a master latch, a slave latch, a liquid crystal display element, and first to third switching transistors, which are three transistors in total (see Published Japanese Translation of PCT Patent Application No. 2001-523847, for example). In this pixel, one bit of a first data is applied to one input terminal of two input terminals of the master latch through the first switching transistor; a second data in the complementary relation with the first data is applied to the other input terminal through the second switching transistor; and when the pixel is selected by a row select signal applied through a row scanning line, the first data is written as the first and second switching transistors are turned to the ON-state. For example, when the first data has the logical value "1" and the second data has the logical value "0", the pixel performs display.

After the data are written to all the pixels through the similar operations described above, the data that are written into the master latch are simultaneously read out to the slave latch as the third switching transistors of all the pixels are turned to the ON-state in the subframe period, and the data latched to the slave latch are applied from the slave latch to the pixel electrode of the liquid crystal display element. The operations above are then repeated for the individual subframes, and desired gradation display is performed with the combinations of all the subframes in a frame period.

Namely, in the liquid crystal display device according to the subframe driving method, the display periods of all the subframes in a frame period are pre-allocated to the same period or a different predetermined period. In the pixels, display is performed on all the subframes in the maximum gradation display; display is not performed on all the subframes in the minimum gradation display; and subframes for display are selected according to the gradation for display in a case where the other gradations are to be displayed. In the previous liquid crystal display device, input data is digital data expressing a gradation, which is also a digital driving technique with a two-stage latch configuration.

However, in the liquid crystal display device in the prior art, since the two latches in the pixels are configured of static random access memories (SRAMs), the number of transistors is increased and it is difficult to downsize the pixels. Moreover, Published Japanese Translation of PCT Patent Application No. 2001-523847 above does not disclose a specific circuit configuration of SRAMs and switching transistors that stably operates in a case where the two latches are configured of SRAMs.

The present invention is made in the viewpoints above, and there is a need to provide a liquid crystal display device that can downsize a pixel compared with a pixel using two SRAMs therein.

Moreover, there is another need to provide a liquid crystal display device including a pixel that can stably operate even in the configuration in which two SRAMs are provided in individual pixels.

SUMMARY OF THE INVENTION

To attain the object above, provided is a first invention of a liquid crystal display device that includes: a plurality of pixels individually provided at an intersecting portion at which a plurality of column data lines intersects with a plurality of row scanning lines, each of the pixels individually including: a display element configure to have liquid crystals filled and sealed between a pixel electrode and a common electrode opposing to each other; a first switching unit configured to sample subframe data for displaying every frame of a video signal in a plurality of subframes having a display period shorter than one frame period of the video signal through the column data line; a first signal holding unit configured to form a static random access memory together with the first switching unit and configured to store the subframe data sampled by the first switching unit; a second switching unit configured to output the subframe data stored in the first signal holding unit; and a second signal holding unit configured to form a dynamic random access memory together with the second switching unit, in which stored content is rewritten with the subframe data stored in the first signal holding unit supplied through the second switching unit, and configured to apply output data to the pixel electrode; and a pixel control unit configured to perform, for individual subframes, operations of: after writing into all of the plurality of pixels, which configures an image display unit, by repeatedly writing the subframe data to the first signal holding unit for the individual pixels in units of rows; turning on the second switching units in all of the plurality of pixels with a trigger pulse; and rewriting stored content in the second signal holding units of the plurality of pixels with the subframe data stored in the first signal holding unit.

To attain the object above, provided is a second invention of a liquid crystal display device that includes: a plurality of pixels individually provided at an intersecting portion at which a plurality of pairs of two column data lines intersects with a plurality of row scanning lines, each of the pixels individually including: a display element configured to have liquid crystals filled and sealed between a pixel electrode and a common electrode opposing to each other; a first switching unit configured to sample normal subframe data for displaying each frame of a video signal in a plurality of subframes having a display period shorter than one frame period of the video signal through one column data line of a pair of the two column data lines; a second switching unit configured to sample reverse subframe data in relation of inverted logical value with the normal subframe data through the other column data line of a pair of the two column data lines; a first signal holding unit formed of first and second inverters in which an output terminal of one inverter is connected to an input terminal of the other inverter, configured to store the normal subframe data and the reverse subframe data sampled by the first switching unit and the second switching unit individually, and configured to form a first static random access memory together with the first switching unit and the second switching unit; a third switching unit configured to output the normal subframe data from a connecting point between the first signal holding unit and the first switching unit; a fourth switching unit configured to output the reverse subframe data from a connecting point between the first signal holding unit and the second switching unit; and a second signal holding unit formed of third and fourth inverters in which an output terminal of one inverter is connected to an input terminal of the other inverter, in which stored content is rewritten with the normal subframe data and the reverse subframe data stored in the first signal holding unit supplied through the third switching unit and the fourth switching unit, configured to apply output data to the pixel electrode, and configured to form a second static random access memory together with the third switching unit and the fourth switching unit, wherein: in the first and second inverters, a driving force of the second inverter of which output terminal is connected to the first switching unit is set smaller than a driving force of the first inverter of which output terminal is connected to the second switching unit, and the driving forces of the first and second inverters are set larger than driving forces of the third and fourth inverters; and a pixel control unit performs, for each individual subframe, operations of: after writing into all the plurality of pixels, which configures an image display unit, by repeatedly writing the normal subframe data and the reverse subframe data into the first signal holding unit for each of the pixels in units of rows; turning on the third switching units and the fourth switching units of all of the plurality of pixels with a trigger pulse; and rewriting the stored content in the second signal holding units of the plurality of pixels with the normal subframe data and the reverse subframe data that are held in the first signal holding unit.

To attain the object above, provided is a third invention of a liquid crystal display device that includes: a plurality of pixels individually provided at an intersecting portion at which a plurality of column data lines intersects with a plurality of row scanning lines, each of the pixels individually including: a display element configured to have liquid crystals filled and sealed between a pixel electrode and a common electrode opposite to each other; a first switching unit formed of a single transistor, and configured to sample subframe data for displaying every frame of a video signal in a plurality of subframes having a display period shorter than one frame period of the video signal through the column data line; a first signal holding unit, formed of first and second inverters in which an output terminal of one inverter is connected to an input terminal of the other inverter, and stores the subframe data sampled by the first switching unit, and forming a first static random access memory together with the first switching unit; a second switching unit formed of a single transistor, and configured to output the subframe data stored in the first signal holding unit; and a second signal holding unit formed of third and fourth inverters, in which stored content is rewritten with the subframe data stored in the first signal holding unit supplied through the second switching unit, output data is applied to the pixel electrode, and an output terminal of one inverter is connected to an input terminal of the other inverter, and forms a second static random access memory together with the second switching unit, wherein in the first and second inverters, a driving force of the second inverter of which output terminal is connected to the first switching unit is set smaller than a driving force of the first inverter and set smaller than a driving force of the transistor forming the first switching unit; in the third and fourth inverters, a driving force of the fourth inverter of which output terminal is connected to the second switching unit is set smaller than a driving force of the third inverter and set smaller than a driving force of the transistor forming the second switching unit, and the driving force of the first inverter is set larger than the driving force of the fourth inverter; and a pixel control unit configured to perform, for individual subframes, the operations of: after writing into all of the plurality of pixels, which configures an image display unit, by repeatedly writing the subframe data to the first signal holding unit for the individual pixels in units of rows; turning on the second switching units in all of the plurality of pixels with a trigger pulse; and rewriting the stored content in the second signal holding units of the plurality of pixels with the subframe data stored in the first signal holding unit.

DETAILED DESCRIPTION OF THE PREFERRED EMBODIMENTS

In the following, embodiments will be described with reference to the drawings.

Figure 1:
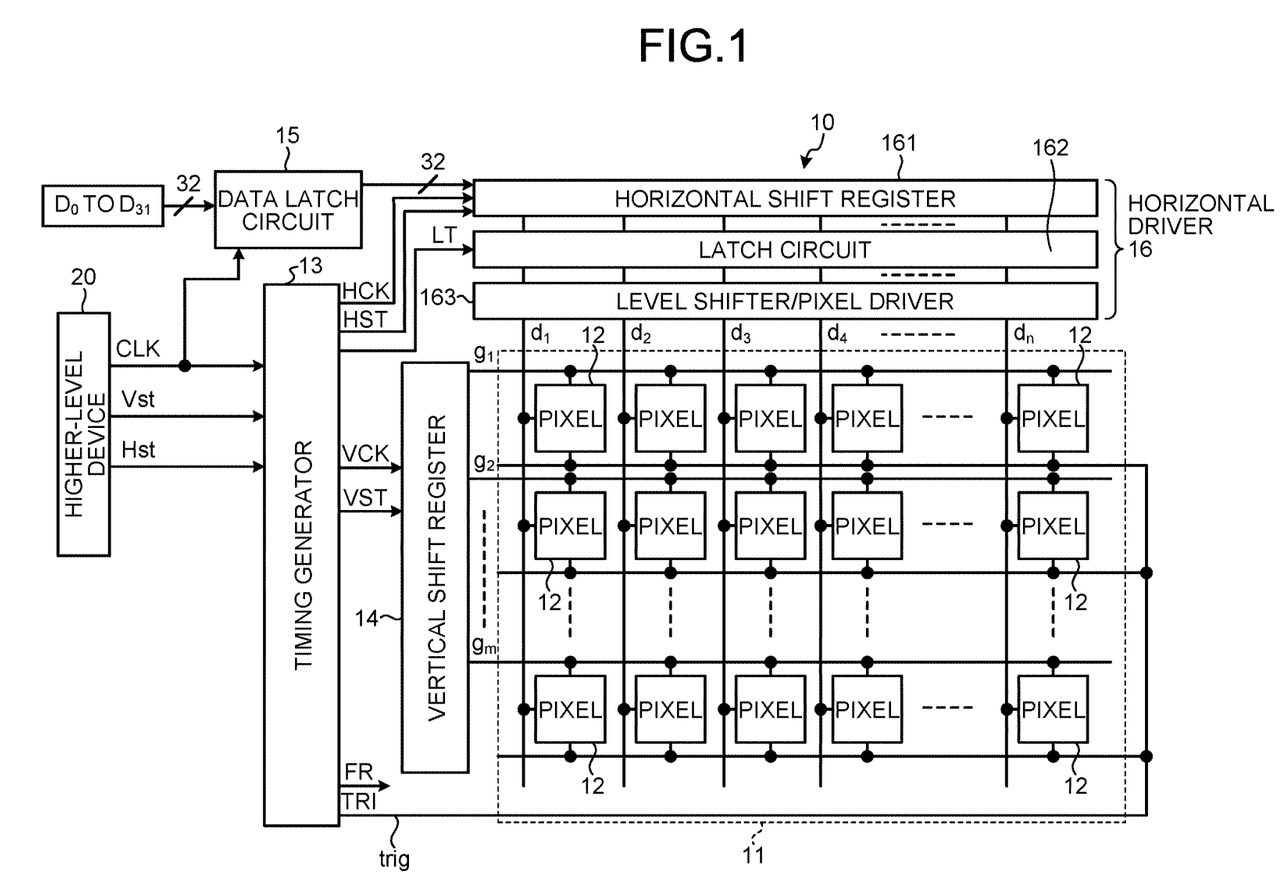
FIG. 1 is a diagram of an overall structure of an embodiment of a liquid crystal display device according to each embodiment.

FIG. 1 is a block diagram of a liquid crystal display device applicable to the embodiments. In FIG. 1, a liquid crystal display device 10 according to the embodiment is configured of an image display unit 11 on which a plurality of pixels 12 is regularly arranged, a timing generator 13, a vertical shift register 14, a data latch circuit 15, and a horizontal driver 16. Moreover, the horizontal driver 16 is configured to include a horizontal shift register 161, a latch circuit 162, and a level shifter/pixel driver 163.

The image display unit 11 includes m×n of pixels 12 in total arranged in a two-dimensional matrix configuration and individually provided at intersecting portions of m (m is two or more of natural numbers) row scanning lines $g_1$ to $g_m$ and n (n is two or more of natural numbers) column data lines $d_1$ to $d_n$; in which one ends of the row scanning lines are connected to the vertical shift register 14 and the row scanning lines extend in the row direction (in the X-direction), and one ends of the column data lines are connected to the level shifter/pixel driver 163 and the column data lines extend in the column direction (in the Y-direction). The embodiments have features in the circuit configuration of the pixel 12, and the embodiments will be described later. All the pixels 12 in the image display unit 11 are connected to a trigger line trig in common, where one end of the trigger line trig is connected to the timing generator 13.

It is noted that n column data lines $d_1$ to $d_n$ are illustrated as the column data lines in FIG. 1. However, in some cases, used are n pairs of the column data lines in total, in which a normal data column data line $d_j$ is paired with an inverted data column data line $d_{bj}$. Normal data that the normal data column data line $d_j$ transmits and inverted data that the inverted data column data line $d_{bj}$ transmits are one bit of data in the relation of inverted logical values (in the complementary relation) all the time. Moreover, only one trigger line trig is illustrated in FIG. 1; however, in some cases, two trigger lines formed of a normal trigger pulse trigger line trig and an inverted trigger pulse trigger line trigb are used. A normal trigger pulse that the normal trigger pulse trigger line trig transmits and an inverted trigger pulse that the inverted trigger pulse trigger line trigb transmits are in the relation of inverted logical values (in the complementary relation) all the time.

The timing generator 13 receives external signals such as a vertical synchronization signal Vst, a horizontal synchronization signal Hst, and a basic clock CLK as input signals from a higher-level device 20; and generates various internal signals such as an alternating signal FR, a V-start pulse VST, a H-start pulse HST, clock signals VCK and HCK, a latch pulse LT, and a trigger pulse TRI based on these external signals.

In the internal signals above, the alternating signal FR is a signal whose polarity is reversed for every subframe, and is supplied as a common electrode voltage Vcom, described later, to the common electrode of the liquid crystal display element in the pixel 12 configuring the image display unit 11. The start pulse VST is a pulse signal output at the start timing of subframes, described later, and the switching between subframes are controlled by the start pulse VST. The start pulse HST is a pulse signal output at the start timing at which the signal is input to the horizontal shift register 161. The clock signal VCK is a shift clock that regulates one horizontal scanning period (one H) in the vertical shift register 14, and the vertical shift register 14 performs the shift operation at the VCK timing. The clock signal HCK is a shift clock in the horizontal shift register 161, and is a signal for shifting data in 32-bit width.

The latch pulse LT is a pulse signal output at the timing at which the horizontal shift register 161 finishes shifting data of pixels on one line in the horizontal direction. The trigger pulse TRI is a pulse signal supplied to all the pixels 12 in the image display unit 11 through the trigger line trig. This trigger pulse TRI is output immediately after data is in turn written to first signal holding units in the pixels 12 in the image display unit 11; and transfers data in the first signal holding units of all the pixels 12 in the image display unit 11 to second signal holding units in the same pixels at one time in the subframe period.

The vertical shift register 14 transfers the V-start pulse VST supplied at the beginning of subframes according to the clock signal VCK, and exclusively in turn supplies a row scanning signal to the row scanning lines $g_1$ to $g_m$ per horizontal scanning period. Thus, the row scanning line is in turn selected one by one per horizontal scanning period from the uppermost row scanning line $g_1$ to the undermost row scanning line $g_m$ in the image display unit 11.

The data latch circuit 15 latches data in 32-bit width split for every one subframe supplied from an external circuit, not illustrated, based on the basic signal CLK from the higher-level device 20; and then outputs the data to the horizontal shift register 161 in synchronization with the basic signal CLK. Here, in the embodiments, one frame of a video signal is divided into a plurality of subframes having a display period shorter than one frame period of the video signal; and gradation display is performed according to the combination of subframes. In the embodiments, the external circuit above converts gradation data expressing the gradation for individual pixels of the video signal into one-bit subframe data in units of subframes for displaying the gradation of the pixels in a plurality of the overall subframes. The external circuit above then supplies 32 pixels of the subframe data in the same subframe together as the data in 32-bit width to the data latch circuit 15.

As considered in the process system of one-bit serial data, the horizontal shift register 161 starts shifting by the H-start pulse HST supplied from the timing generator 13 at the beginning of one horizontal scanning period, and shifts data in 32-bit width supplied from the data latch circuit 15 in synchronization with the clock signal HCK. The latch circuit 162 latches n bits of data supplied in parallel from the horizontal shift register 161 (namely, n pixels of subframe data in the same row) according to the latch pulse LT supplied from the timing generator 13 at the point in time at which the horizontal shift register 161 finishes shifting n bits of data the same as a row of the pixel number n in the image display unit 11; and outputs the data to the level shifter of the level shifter/pixel driver 163. When data transfer to the latch circuit 162 is finished, the H-start pulse is again output from the timing generator 13; and the horizontal shift register 161 again starts shifting data in 32-bit width from the data latch circuit 15 according to the clock signal HCK.

The level shifter of the level shifter/pixel driver 163 shifts the signal level of data of n subframes corresponding to a row of n pixels latched and supplied from the latch circuit 162 to the liquid crystal drive voltage. The pixel driver of the level shifter/pixel driver 163 outputs data of n subframes corresponding to a row of n pixels after level-shifted in parallel with n data lines $d_1$ to $d_n$.

The horizontal shift register 161, the latch circuit 162, and the level shifter/pixel driver 163 configuring the horizontal driver 16 perform outputting data of a row of pixels to which data is written this time in one horizontal scanning period in parallel with shifting data related to a row of pixels to which data is written in the subsequent horizontal scanning period. In a certain horizontal scanning period, the latched data of n subframes in a row is simultaneously output as data signals concurrently with n data lines $d_1$ to $d_n$.

In a plurality of the pixels 12 configuring the image display unit 11, a row of n pixels 12 selected by the row scanning signal from the vertical shift register 14 samples a row of data of n subframes simultaneously output from the level shifter/pixel driver 163 through n data lines $d_1$ to $d_n$; and writes the data into the first signal holding units, described later, in the pixels 12.

Next, the pixel 12, which is the essential part of the liquid crystal display device according to the embodiment, will be described in detail.

Figure 2:
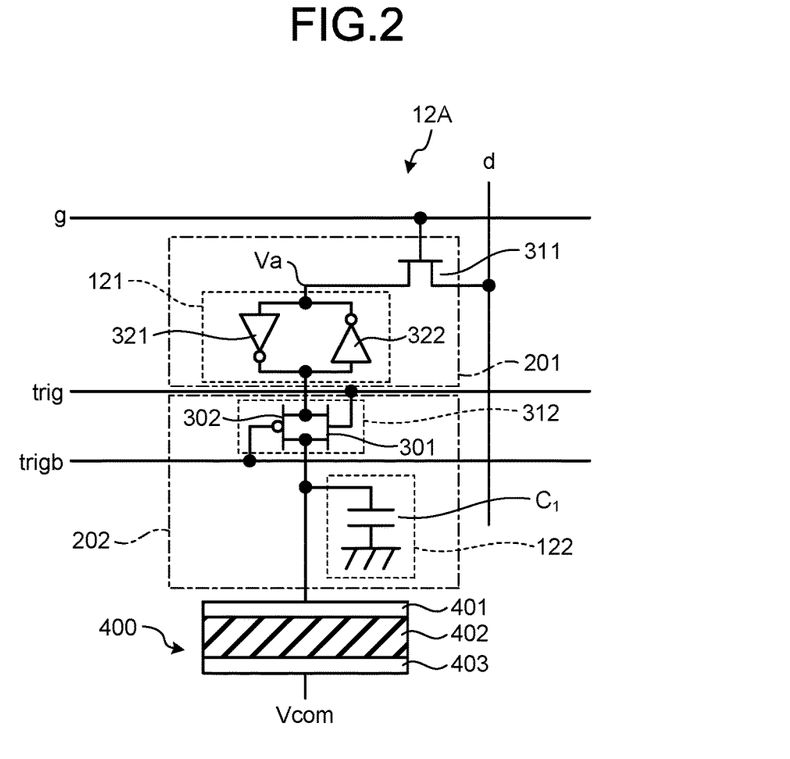
FIG. 2 is a circuit diagram of a pixel according to a first embodiment.

FIG. 2 is a circuit diagram of the pixel according to the first embodiment. In FIG. 2, a pixel 12A according to the first embodiment is a pixel provided at the intersecting portion of a given column data line d and a given row scanning line g in FIG. 1. The pixel 12A is configured to include a static random access memory (SRAM) 201 configured of a switch 311 configuring a first switching unit and a first signal holding unit (SM) 121, a dynamic random access memory (DRAM) 202 configured of a switch 312 configuring a second switching unit and a second signal holding unit (DM) 122, and a liquid crystal display element 400. The liquid crystal display element 400 is in a publicly known structure in which liquid crystals 402 are filled and sealed in a gap between a reflecting electrode 401 and a common electrode 403 provided apart from each other and opposite to each other.

Figure 3:
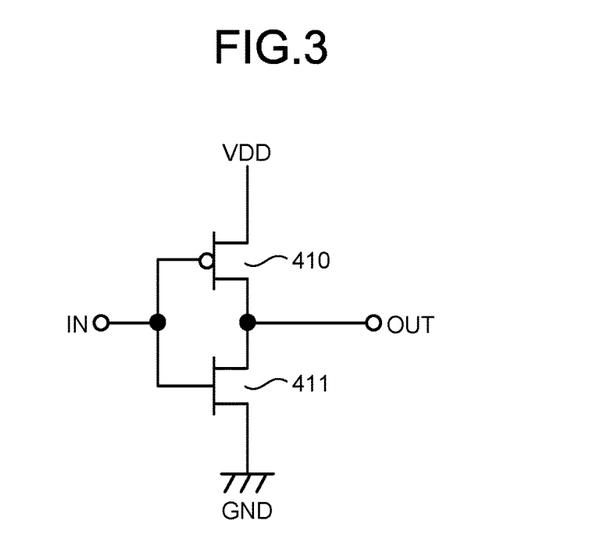
FIG. 3 is a circuit diagram of an exemplary inverter according to the first embodiment.

The switch 311 is configured of an N-channel MOS (Metal-Oxide-Semiconductor) transistor (hereinafter, referred to as an NMOS transistor) in which the gate is connected to the row scanning line g, the drain is connected to the column data line d, and the source is connected to the input terminal of the SM 121. The SM 121 is a self-holding memory formed of two inverters 321 and 322 in which an output terminal of one inverter is connected to an input terminal of the other inverter. The input terminal of the inverter 321 is connected to the output terminal of the inverter 322 and the source of the NMOS transistor configuring 311. The input terminal of the inverter 322 is connected to the switch 312 and the output terminal of the inverter 321. Both of the inverters 321 and 322 are in the configuration of a publicly known CMOS (Complementary Metal-Oxide-Semiconductor) inverter formed of a P-channel MOS transistor (hereinafter, referred to as a P-MOS transistor) 410 and an NMOS transistor 411 in which the gates of the transistors are connected to each other and the drains are connected to each other as illustrated in FIG. 3. However, the driving forces of the transistors are different.

Namely, the transistor, which is in the inverter 321 on the input side configuring the SM 121 when seen from the switch 311, is used whose driving force is larger than the driving force of the transistor in the inverter 322 on the output side configuring the SM 121 when seen from the switch 311. Moreover, the driving force of the NMOS transistor configuring the switch 311 is configured of a transistor whose driving force is larger than the driving force of the NMOS transistor configuring the inverter 322.

This is because in the case where data on the SM 121 is rewritten, it is necessary to increase a voltage Va more than the input voltage at which the inverter 321 is inverted particularly when the voltage Va on the input side of the switch 311 of the SM 121 is at "L" level and data transmitted through the column data line d is at "H" level. The voltage Va at "H" level is determined according to the ratio between the electric current of the NMOS transistor configuring the inverter 322 and the electric current of the NMOS transistor configuring the switch 311. At this time, since the switch 311 is an NMOS transistor, the voltage on the VDD side of a power supply supplied through the column data line d is not input to the SM 121 due to a threshold voltage Vth of the transistor when the switch 311 is on; and the voltage at "H" level becomes a voltage lower than the VDD by the Vth. In addition, since the switch 311 is driven near the Vth of the transistor, an electric current hardly flows at this voltage. In other words, the higher the voltage Va conducted through the switch 311 is, the lower the electric current caused to flow at the switch 311 is.

In other words, in order that the voltage Va reaches a voltage or more at which the transistor on the input side of the inverter 321 is inverted when the voltage Va is at "H" level, it is necessary that the electric current carried through the switch 311 be larger than the electric current carried through the NMOS transistor configuring the transistor on the output side of the inverter 322. Therefore, in order to form the driving force of the NMOS transistor configuring the switch 311 larger than the driving force of the NMOS transistor configuring the inverter 322, it is necessary to determine the transistor size of the NMOS transistor configuring the switch 311 and the transistor size of the NMOS transistor configuring the inverter 322 in consideration of this.

The switch 312 is in a publicly known transmission gate configuration formed of an NMOS transistor 301 and a P-MOS transistor 302 in which the drains of the transistors are connected to each other and the sources are connected to each other. The gate of the NMOS transistor 301 is connected to the normal trigger pulse trigger line trig, and the gate of the P-MOS transistor 302 is connected to the inverted trigger pulse trigger line trigb.

Moreover, one terminal of the switch 312 is connected to the SM 121, and the other terminal is connected to the DM 122 and the reflecting electrode 401 of the liquid crystal display element 400. Therefore, when the normal trigger pulse supplied through the trigger line trig is at "H" level (at this time, the inverted trigger pulse supplied through the trigger line trigb is at "L" level), the switch 312 is turned on, and reads and transfers data stored on the SM 121 to the DM 122 and the reflecting electrode 401. Furthermore, when the normal trigger pulse supplied through the trigger line trig is at "L" level (at this time, the inverted trigger pulse supplied through the trigger line trigb is at "H" level), the switch 312 is turned off, and does not read data stored on the SM 121.

The switch 312 is in a publicly known transmission gate configuration formed of the NMOS transistor 301 and the P-MOS transistor 302, so that voltages ranging from the GND to the VDD can be turned on and off. In other words, when a signal applied to the gates of the NMOS transistor 301 and the P-MOS transistor 302 is at the GND-side potential (at "L" level), the NMOS transistor 301 can be conducted at low resistance instead that the P-MOS transistor 302 is not enabled to be conducted. On the other hand, when the gate input signal is at the VDD-side potential (at "H" level), the P-MOS transistor 302 can be conducted at low resistance instead that the NMOS transistor 301 is not enabled to be conducted. Therefore, the transmission gate configuring the switch 312 is controlled to be turned on/off using the normal trigger pulse supplied through the trigger line trig and the inverted trigger pulse supplied through the trigger line trigb; so that the voltage range of the GND to the VDD can be switched at low resistance and high resistance.

The DM 122 is configured of a capacitance $C_1$. Here, in the case where data stored on the SM 121 is different from data held on the DM 122, and when the switch 312 is turned on and data stored on the SM 121 is transferred to the DM 122, it is necessary to replace the data held on the DM 122 with the data stored on the SM 121.

In the case where data held on the capacitance $C_1$ configuring the DM 122 is rewritten, the held data is changed by charging or discharging, and charging and discharging the capacitance $C_1$ are driven by the output signal of the inverter 321. In the case where data held on the capacitance $C_1$ is rewritten from "L" level to "H" level by charging, the output signal of the inverter 321 is at "H". At this time, since the P-MOS transistor configuring 321 (the P-MOS transistor 410 in FIG. 3) is turned on and the NMOS transistor (the NMOS transistor 411 in FIG. 3) is turned off, the power supply voltage VDD connected to the source of the P-MOS transistor of the inverter 321 charges the capacitance $C_1$. On the other hand, in the case where data held on the capacitance $C_1$ is rewritten from "H" level to "L" level by discharging, the output signal of the inverter 321 is at "L" level. At this time, since the NMOS transistor configuring the inverter 321 (the NMOS transistor 411 in FIG. 3) is turned on and the P-MOS transistor (the P-MOS transistor 410 in FIG. 3) is turned off, electric charges accumulated on the capacitance $C_1$ are discharged to the GND through the NMOS transistor (the NMOS transistor 411 in FIG. 3) of the inverter 321. The switch 312 is in an analog switch configuration using the transmission gate described above, so that it is possible to charge and discharge the capacitance $C_1$ described above at high speed.

Moreover, in the first embodiment, the driving force of the inverter 321 is set larger than the driving force of the inverter 322, so that it is possible to drive the charging and discharging of the capacitance $C_1$ configuring the DM 122 at high speed. Furthermore, when the switch 312 is turned on, the electric charges accumulated on the capacitance $C_1$ also affect the input gate of the inverter 322. However, since the driving force of the inverter 321 is set larger than the driving force of the inverter 322, charging and discharging the capacitance $C_1$ by the inverter 321 are performed prior to reversing data input by the inverter 322; and data stored on the SM 121 is not rewritten.

It is noted that it is also considered that the SRAM 201 and the DRAM 202 are in a two-stage DRAM configuration formed of a capacitance and a switch. However, in this case, in the case where a capacitance used instead of the SM 121 is conducted to a capacitance configuring the DM, electric charges are neutralized, and the amplitude between the voltages GND and VDD is not provided. On the contrary, according to the pixel 12A illustrated in FIG. 2, one bit of data can be transferred from the SM 121 to the DM 122 in the amplitude between the voltages GND and VDD. In the case where the pixel 12A is driven at the same power supply outage, the applied voltage of the liquid crystal display element 400 can be set higher, and a wide dynamic range can be provided.

Moreover, it is also considered that the SRAM 201 is changed to the configuration formed of a capacitance and a switch and the DRAM 202 is changed to an SRAM. However, in this case, a problem arises in that the operation becomes unusable more than the operation in the pixel 12A illustrated in FIG. 2 according to the first embodiment. Namely, in the case of the configuration above, it is necessary to rewrite data stored on the SRAM used instead of the DM 122 with electric charges accumulated on a capacitance used instead of the SM 121. At this time, generally, since the data holding capability of the memory by the SRAM is stronger than the electric charge holding capability of the capacitance, it is likely to raise a problem in that electric charges of the capacitance used instead of the SM 121 in the previous stage are rewritten with data stored on the SRAM used instead of the DM 122. Moreover, in this case, sine it is necessary to provide a large capacitance so as not to rewrite the capacitance used instead of the SM 121 with data on the SRAM in the subsequent stage, a problem arises in that the pixel pitch is increased and it is difficult to downsize pixels.

In accordance with the pixel 12A illustrated in FIG. 2 according to the first embodiment, it is possible to set a higher applied voltage of the liquid crystal display element 400 as described above, and it is possible to obtain a great effect that the pixel can be downsized as well as the effect that a wide dynamic range can be achieved. Since the inverters 321 and 322 are each configured of two transistors as illustrated in FIG. 2, the pixel can be downsized because the pixel is configured of seven transistors in total and a single capacitance $C_1$, and the pixel can be configured of a fewer number of component elements than the component elements of the previously existing pixel. In addition to this reason, as described below, the SM 121, the DM 122, and the reflecting electrode 401 can be effectively disposed in the height direction of the elements.

Figure 4:
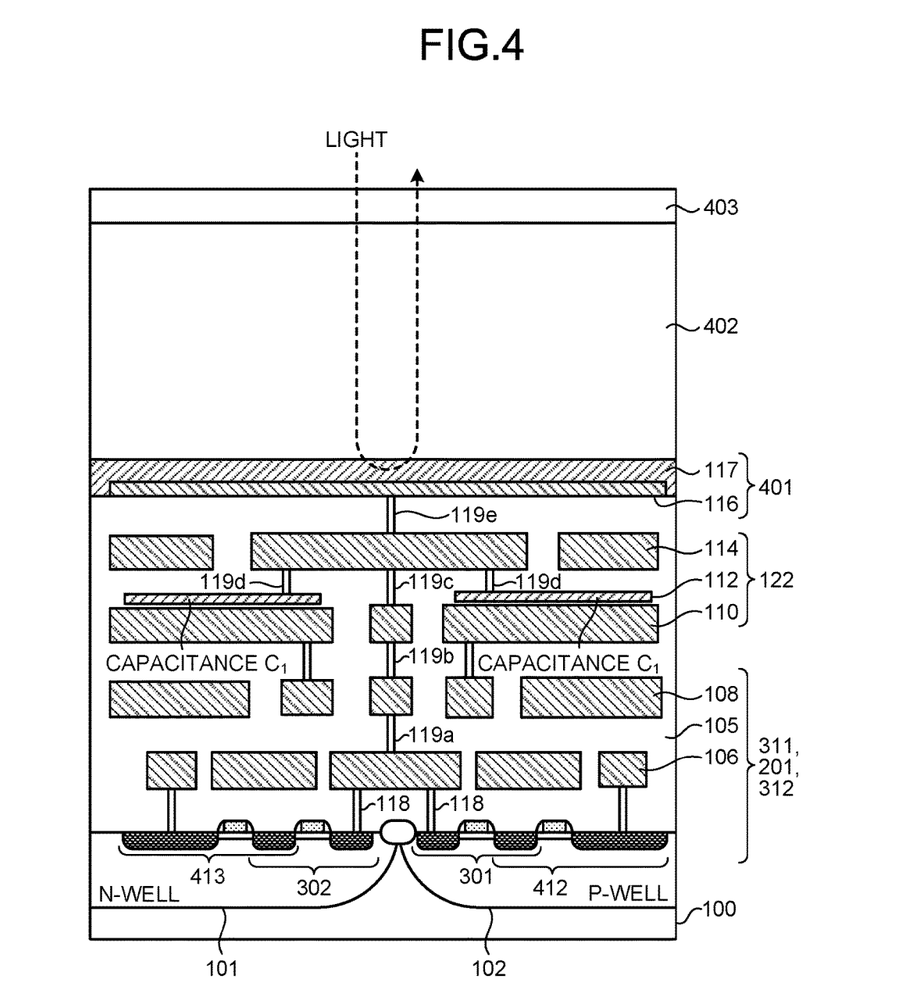
FIG. 4 is a structural diagram of an exemplary cross section of the pixel according to the first embodiment illustrated in FIG. 2.

FIG. 4 is a cross sectional block diagram of the pixel, which is the essential part of the liquid crystal display device according to the first embodiment. For the capacitance $C_1$ illustrated in FIG. 2, such capacitances can be used including a MIM (Metal-Insulator-Metal) capacitance forming a capacitance between interconnections, a Diffusion capacitance forming a capacitance between a substrate and polysilicon, and a PIP (Poly-Insulator-Poly) capacitance forming a capacitance between polysilicon in two layers. FIG. 4 is a cross sectional block diagram of a liquid crystal display device in the case where the capacitance $C_1$ is configured of a MIM.

In FIG. 4, on an N-well 101 formed on a silicon substrate 100, a P-MOS transistor 413 of the inverter 321 and the P-MOS transistor 302 of the switch 312 are formed in which the drains are connected to each other by sharing a diffusion layer to be the drains. Moreover, on a P-well 102 formed on the silicon substrate 100, an NMOS transistor 412 of the inverter 322 and the NMOS transistor 301 of the switch 312 are formed in which the drains are connected to each other by sharing a diffusion layer to be the drains. It is noted that the NMOS transistor configuring the inverter 321 and the P-MOS transistor configuring the inverter 322 are not illustrated in FIG. 4.

Furthermore, above the transistors 413, 302, 301, and 412 mentioned above, a first metal 106, a second metal 108, a third metal 110, an electrode 112, a fourth metal 114, and a fifth metal 116 are stacked within an interlayer insulating film 105 provided between the metals. The fifth metal 116 configures the reflecting electrode 401 formed for the individual pixels. The diffusion layers configuring the sources of the NMOS transistor 301 and the P-MOS transistor 302 configuring the switch 312 are connected to the first metal 106 through a contact 118, and further electrically connected to the second metal 108, the third metal 110, the fourth metal 114, and the fifth metal 116 via through holes 119a, 119b, 119c, and 119e. Namely, the sources of the NMOS transistor 301 and the P-MOS transistor 302 configuring the switch 312 are electrically connected to the reflecting electrode 401.

Moreover, a passivation film (PSV) 117 is formed as a protective film on the reflecting electrode 401 (the fifth metal 116), and is provided apart from and opposite to the common electrode 403 which is a transparent electrode. The liquid crystals 402 are filled and sealed between the reflecting electrode 401 and the common electrode 403 so as to configure the liquid crystal display element 400.

Here, the electrode 112 is formed on the third metal 110 through the interlayer insulating film 105. This electrode 112 configures the capacitance $C_1$ together with the interlayer insulating film 105 between the third metal 110 and the third metal 110. When the capacitance $C_1$ is configured using an MIM, the SM 121, the switch 311, and the switch 312 can be formed of one-layer and two-layer interconnections of the transistors and the first metal 106 and the second metal 108, and the DM 122 can be formed of MIM interconnections using the third metal 110 above the transistor. Since the electrode 112 is electrically connected to the fourth metal through the through hole 119d and the fourth metal 114 is electrically connected to the reflecting electrode 401 through the through hole 119e, the capacitance $C_1$ is electrically connected to the reflecting electrode 401.

Light from a light source not illustrated is transmitted through the common electrode 403 and the liquid crystals 402, incident on the reflecting electrode 401 (the fifth metal 116) and reflected, returned through the original incident path, and emitted through the common electrode 403.

According to the first embodiment, as illustrated in FIG. 4, the fifth metal 116 in the five-layer interconnection is allocated to the reflecting electrode 401, so that the SM 121, the DM 122, and the reflecting electrode 401 can be effectively arranged in the height direction, and the pixel can be downsized. Thus, a pixel having a pitch of three micrometers or less, for example, can be configured of a transistor having a power supply voltage of 3.3 V. A liquid crystal display panel having 4,000 pixels crosswise and 2,000 pixels lengthwise in a diagonal length of 0.55 inches can be implemented using this pixel having a three-micrometer pitch.

Next, the operation of the liquid crystal display device 10 in FIG. 1 using the pixel 12A according to the first embodiment will be described with reference to a timing chart in FIG. 5.

As described above, in the liquid crystal display device 10 in FIG. 1, since the row scanning line is in turn selected one by one per horizontal scanning period from the row scanning line $g_1$ to the row scanning line $g_m$ by the row scanning signal from the vertical shift register 14, data is written to a plurality of the pixels 12 configuring the image display unit 11 (in the first embodiment, the pixels 12A) per row of n pixels connected in common to the selected row scanning line. After all a plurality of the pixels 12 configuring the image display unit 11 (in the first embodiment, the pixels 12A) is written, and then all the pixels are simultaneously read out based on the trigger pulse.

Figure 5:
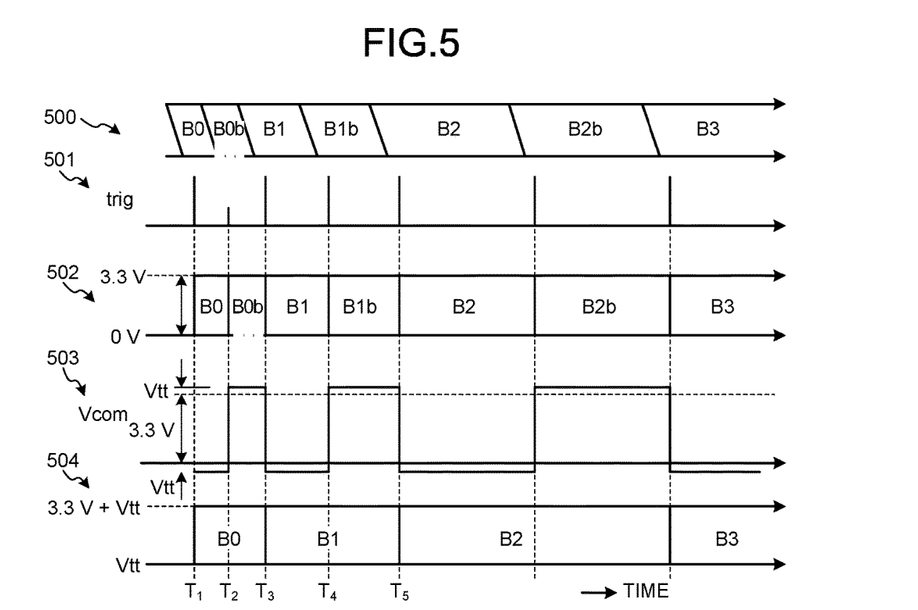
FIG. 5 is a timing chart for describing the operation of the pixel in the liquid crystal display device according to the first embodiment.

In FIG. 5, a chart 500 schematically illustrates the write period and the read period of one pixel for one bit of subframe data output from the horizontal driver 16 to the column data line d ($d_1$ to $d_n$). Slashes, from right to left, depict the write periods. It is noted that in the chart 500, "B0b", "B1b", and "B2b" express inverted data of data of bits "B0", "B1", and "B2". Moreover, in FIG. 5, a chart 501 is a trigger pulse output from the timing generator 13 to the normal trigger pulse trigger line trig. This trigger pulse is output for every one subframe. It is noted that the inverted trigger pulse output to the inverted trigger pulse trigger line trigb always takes an inverted logical value to the normal trigger pulse, and is omitted in the drawing.

First, in the pixel 12A, when a selection is made by the row scanning signal, the switch 311 is turned on, and the bit "B0" of normal subframe data output to the column data line d in the chart 500 when the switch 311 is turned on is sampled by the switch 311, and written to the SM 121 of the pixel 12A. In the following, similarly, the bit B0 of subframe data is written to the SMs 121 of all the pixels 12A configuring the image display unit 11; and after the write operation is finished, the normal trigger pulse at "H" level is simultaneously supplied to all the pixels 12A configuring the image display unit 11 at time $T_1$ illustrated in FIG. 5, as illustrated in the chart 501.

Thus, since the switches 312 of all the pixels 12A are turned on, the bit "B0" of normal subframe data stored in the SM 121 is simultaneously transferred and held in the capacitance $C_1$ configuring the DM 122 through the switches 312, and is applied to the reflecting electrode 401. The holding period of the bit "B0" of normal subframe data by this capacitance $C_1$ is one subframe period from time $T_1$ to time $T_2$ at which the subsequent normal trigger pulse at "H" level is input as illustrated in the chart 501. In FIG. 5, a chart 502 schematically illustrates bits of subframe data applied to the reflecting electrode 401.

Here, when the bit value of subframe data is "1", that is, at "H" level, the power supply voltage VDD (a voltage of 3.3 V here) is applied to the reflecting electrode 401; whereas when the bit value is "0", that is, at "L" level, a voltage of zero V is applied to the reflecting electrode 401. On the other hand, given voltages can be applied as the common electrode voltage Vcom to the common electrode 403 of the liquid crystal display element 400, not limited to the GND and the VDD; and the voltage is switched to the prescribed voltage at the same timing at which the normal trigger pulse at "H" level is input. Here, the common electrode voltage Vcom is set to a voltage lower than a voltage of zero V by a threshold voltage Vtt of the liquid crystals in the subframe period in which normal subframe data is applied to the reflecting electrode 401, as illustrated in a chart 503 in FIG. 5.

The liquid crystal display element 400 performs gradation display according to the applied voltage of the liquid crystals 402, which is the absolute value of a differential voltage between the applied voltage of the reflecting electrode 401 and the common electrode voltage Vcom. Therefore, in one subframe period from time $T_1$ to time $T_2$ for which the bit "B0" of normal subframe data is applied to the reflecting electrode 401, the applied voltage of the liquid crystals 402 is a voltage of 3.3 V+Vtt (=3.3 V−(−Vtt)) when the bit value of subframe data is "1"; and is a voltage of +Vtt (=0 V−(−Vtt)) when the bit value of subframe data is "0" as illustrated in a chart 504 in FIG. 5.

Figure 6:
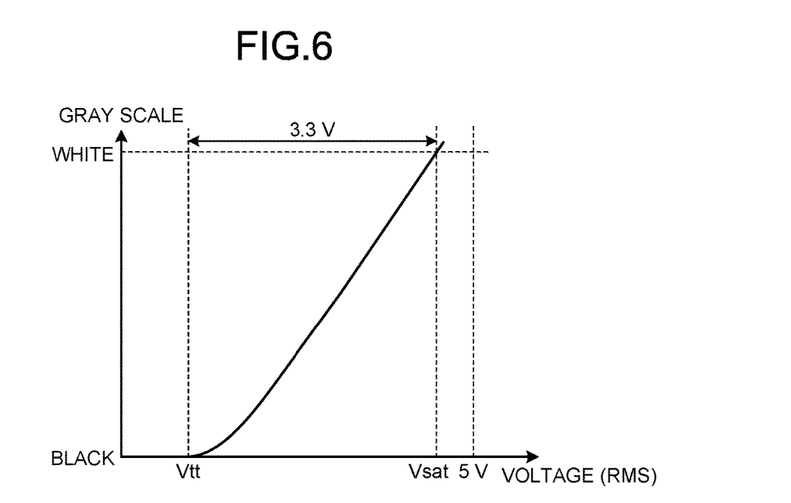
FIG. 6 is a diagram to illustrate that the saturation voltage and threshold voltage of liquid crystals of the liquid crystal display device according to the first embodiment are multiplexed as binary weighted pulse width modulation data.

FIG. 6 is the relation between the applied voltage (RMS (Root Mean Square value) voltage) of the liquid crystals and the gradation value of the liquid crystals. As illustrated in FIG. 6, the gradation value curve is shifted in such a way that a black gradation value corresponds to the RMS voltage of the threshold voltage Vtt of the liquid crystals and a white gradation value corresponds to the RMS voltage of a saturation voltage Vsat (=3.3 V+Vtt) of the liquid crystals. The gradation value can be matched with the effective portion of a liquid crystal response curve. Therefore, the liquid crystal display element 400 displays white when the applied voltage of the liquid crystals 402 is a voltage of (3.3 V+Vtt); and displays black when the applied voltage is a voltage of +Vtt as described above.

Subsequently, in the subframe period in which the bit B0 of normal subframe data is displayed, the write of the reverse subframe data for the bit "B0" to the SM 121 of the pixel 12A is in turn started as illustrated in "B0b" in the chart 500 in FIG. 5. The reverse subframe data for the bit "B0" is then written to the SMs 121 of all the pixels 12A of the image display unit 11; and at time $T_2$ after the write is finished, the normal trigger pulse at "H" level is simultaneously supplied to all the pixels 12A configuring the image display unit 11 as illustrated in the chart 501 in FIG. 5.

Thus, since the switches 312 of all the pixels 12A are turned on, the reverse subframe data for the bit "B0" stored on the SM 121 is transferred and held in the capacitance $C_1$ configuring the DM 122 through the switches 312, and is applied to the reflecting electrode 401. The holding period of the reverse subframe data for the bit "B0" by this capacitance $C_1$ is one subframe period from time $T_2$ to time $T_3$ at which the subsequent normal trigger pulse at "H" level is input as illustrated in the chart 501. Here, since the reverse subframe data for the bit "B0" is always in the relation of the inverted logical value with the bit "B0" of normal subframe data, the value is "0" when the bit "B0" of normal subframe data is "1", whereas the value is "1" when the bit "B0" of normal subframe data is "0".

On the other hand, the common electrode voltage Vcom is set to a voltage higher than a voltage of 3.3 V by the threshold voltage Vtt of the liquid crystals in the subframe period in which the reverse subframe data is applied to the reflecting electrode 401 as illustrated in the chart 503 in FIG. 5. Therefore, in one subframe period from time $T_2$ to time $T_3$ in which the reverse subframe data for the bit "B0" is applied to the reflecting electrode 401, the applied voltage of the liquid crystals 402 is a voltage of −Vtt (=3.3 V−(3.3 V+Vtt)) when the bit value of subframe data is "1", and is a voltage of −3.3 V−Vtt (=0 V−(3.3 V+Vtt)) when the bit value of subframe data is "0".

Therefore, since in the case where the bit value of the bit "B0" of normal subframe data is "1", the bit value of the reverse subframe data for the bit "B0" subsequently input is "0", the applied voltage of the liquid crystals 402 is a voltage of −(3.3 V+Vtt). At this time, the direction of the potential applied to the liquid crystals 402 is in the inverse direction of the bit "B0" of normal subframe data but the absolute values are the same, and so in the pixel 12A, white is similarly displayed in the display of the bit "B0" of normal subframe data. Similarly, since in the case where the bit value of the bit "B0" of normal subframe data is "0", the bit value of the reverse subframe data for the bit "B0" subsequently input is "1", the applied voltage of the liquid crystals 402 is a voltage of −Vtt. At this time, the direction of the potential applied to the liquid crystals 402 is in the inverse direction of the bit "B0" of normal subframe data but the absolute values are the same, and so the pixel 12A displays black.

Therefore, as illustrated in the chart 504 in FIG. 5, in the pixel 12A, the same gradation is displayed with the bit "B0" and the complementary bit "B0b" to the bit "B0" in two subframe periods from time $T_1$ to time $T_3$, and alternating drive is performed in which the direction of the potential of the liquid crystals 402 is reversed for every subframe, so that the burn-in of the liquid crystals 402 can be prevented.

Subsequently, in the subframe period in which the complementary bit "B0b" of reverse subframe data is displayed, the write of the bit "B1" of normal subframe data into the SM 121 of the pixel 12A is in turn started as illustrated in "B1" in the chart 500 in FIG. 5. The bit "B1" of normal subframe data is then written into the SMs 121 of all the pixels 12A of the image display unit 11; and at time $T_3$ after the write is finished, the normal trigger pulse at "H" level is simultaneously supplied to all the pixels 12A configuring the image display unit 11 as illustrated in the chart 501 in FIG. 5.

Thus, since the switches 312 of all the pixels 12A are turned on, the bit "B1" of normal subframe data stored on the SM 121 is transferred and held in the capacitance $C_1$ configuring the DM 122 through the switches 312, and is applied to the reflecting electrode 401. The holding period of the bit "B1" of normal subframe data by this capacitance $C_1$ is one subframe period from time $T_3$ to time $T_4$ at which the subsequent normal trigger pulse at "H" level is input as illustrated in the chart 501.

On the other hand, the common electrode voltage Vcom is set to a voltage lower than a voltage of zero V by a threshold voltage Vtt of the liquid crystals in the subframe period in which normal subframe data is applied to the reflecting electrode 401 as illustrated in the chart 503 in FIG. 5. Therefore, in one subframe period from time $T_3$ to time $T_4$ in which the bit "B1" of normal subframe data is applied to the reflecting electrode 401, the applied voltage of the liquid crystals 402 is a voltage of 3.3 V+Vtt (=3.3 V−(−Vtt)) when the bit value of subframe data is "1"; and is a voltage of +Vtt (=0 V−(−Vtt)) when the bit value of subframe data is "0" as illustrated in the chart 504 in FIG. 5.

Subsequently, in the subframe period in which the bit "B1" of normal subframe data is displayed, the write of the reverse subframe data for the bit "B1" into the SM 121 of the pixel 12A is in turn started as illustrated in "B1b" in the chart 500 in FIG. 5. The reverse subframe data for the bit "B1" is then written into the SMs 121 of all the pixels 12A of the image display unit 11; and at time $T_4$ after the write is finished, the normal trigger pulse at "H" level is simultaneously supplied to all the pixels 12A configuring the image display unit 11 as illustrated in the chart 501 in FIG. 5.

Thus, since the switches 312 of all the pixels 12A are turned on, the reverse subframe data for the bit "B1" stored on the SM 121 is transferred and held in the capacitance $C_1$ configuring the DM 122 through the switches 312, and is applied to the reflecting electrode 401. The holding period of the reverse subframe data for the bit "B0" by this capacitance $C_1$ is one subframe period from time $T_4$ to time $T_5$ at which the subsequent normal trigger pulse at "H" level is input as illustrated in the chart 501 in FIG. 5. Here, the reverse subframe data for the bit "B1" is always in the relation of the inverted logical value with the bit "B1" of normal subframe data.

On the other hand, the common electrode voltage Vcom is set to a voltage higher than a voltage of 3.3 V by the threshold voltage Vtt of the liquid crystals in the subframe period in which the reverse subframe data is applied to the reflecting electrode 401 as illustrated in the chart 503 in FIG. 5. Therefore, in one subframe period from time $T_4$ to time $T_5$ in which the reverse subframe data for the bit "B1" is applied to the reflecting electrode 401, the applied voltage of the liquid crystals 402 is a voltage of −Vtt (=3.3 V−(3.3 V+Vtt)) when the bit value of subframe data is "1", and is a voltage of −3.3 V−Vtt (=0 V−(3.3 V+Vtt)) when the bit value of subframe data is "0".

Thus, as illustrated in the chart 504 in FIG. 5, in the pixel 12A, the same gradation is displayed with the bit "B1" and the complementary bit "B1b" to the bit "B1" in two subframe periods from time $T_3$ to time $T_5$; and alternating drive is performed in which the direction of the potential of the liquid crystals 402 is reversed for every subframe, so that the burn-in of the liquid crystals 402 can be prevented. In the following, the operations similar to the description above are repeated. In accordance with the liquid crystal display device including the pixel 12A according to the embodiment, gradation display can be performed with the combination of a plurality of subframes.

It is noted that the display periods of the bit "B0" and the complementary bit "B0b" are the same first subframe periods, and the display periods of the bit "B1" and the complementary bit "B1b" are the same second subframe periods. However, the first subframe period and the second subframe period are not always the same. Here, for an example, the second subframe period is set twice the first subframe period. Moreover, as illustrated in the chart 504 in FIG. 5, the third subframe period, which is the display periods of the bit "B2" and the complementary bit "B2b", is set twice the second subframe period. The same thing is applied to the other subframe periods, and the lengths of the subframe periods are determined to predetermined lengths according to a system, and the number of the subframe is freely determined.

Next, the other embodiments will be described.

The pixel 12A according to the first embodiment is configured in which the first signal holding unit that samples and stores subframe data supplied through the column data line d is the SM 121 configured of the SRAM 201; and the second signal holding unit that holds the subframe data supplied from the first signal holding unit for a predetermined period and applies the subframe data to the reflecting electrode is the DM 122 configured of the DRAM 202, and thus the downsizing of the pixel, for example, is embodied. On the contrary, pixels according to second and third embodiments described below are configured in which both of first and second signal holding units are formed of SRAMs similarly to the pixel described in Published Japanese Translation of PCT Patent Application No. 2001-523847 above. However, in the pixel according to the second and third embodiments, the SRAM is formed in a predetermined configuration, and the operation is stabilized as compared with the pixel described in Published Japanese Translation of PCT Patent Application No. 2001-523847.

Figure 7:
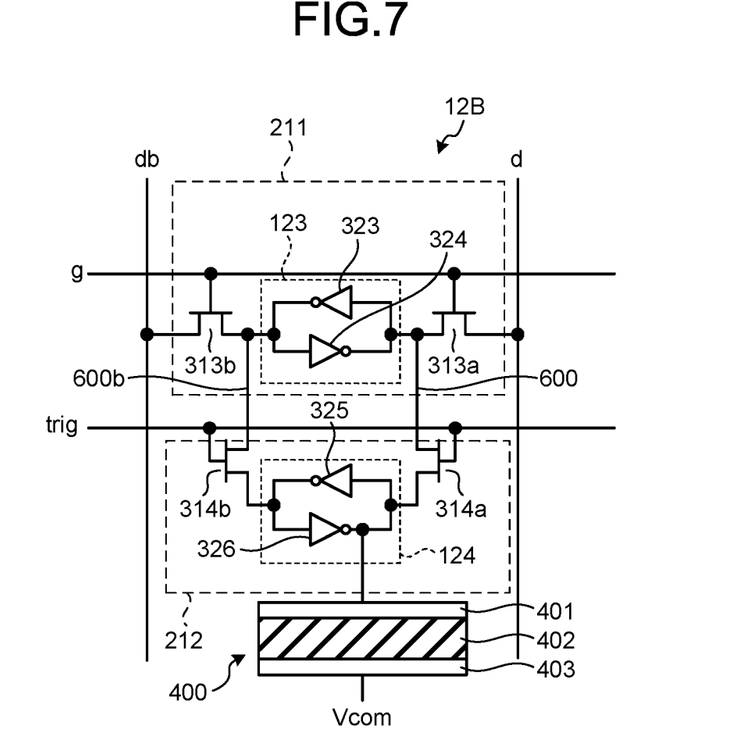
FIG. 7 is a circuit diagram of a pixel according to a second embodiment.

FIG. 7 is a circuit diagram of a pixel, which is the essential part of a liquid crystal display device according to the second embodiment. In FIG. 7, the same reference numerals and signs are designated to the same components in FIG. 2, and the description is omitted. In FIG. 7, a pixel 12B according to the second embodiment is a pixel provided at the intersecting portion of a given row scanning line g and a given pair of a normal data column data line d and an inverted data column data line db in n pairs of the column data lines in total that a normal data column data line $d_j$ is paired with an inverted data column data line $d_{bj}$ in which one end of the row scanning line g is connected to the vertical shift register 14 and the row scanning line g extends in the row direction (in the X-direction) and one end of the column data line is connected to the level shifter/pixel driver 163 in FIG. 1 and the column data line extends in the column direction (in the Y-direction). The pixel 12B is configured to include a first static random access memory (SRAM) 211, a second static random access memory (SRAM) 212, and a liquid crystal display element 400. The first SRAM 211 is configured to include switches 313a and 313b configuring first and second switching units and a first signal holding unit (SM) 123. Moreover, the second SRAM 212 is configured to include switches 314a and 314b configuring third and fourth switching units and a second signal holding unit (SM) 124.

The switch 313a is configured of an NMOS transistor in which the gate is connected to the row scanning line g, the drain is connected to the column data line d, and the source is connected to one input terminal of the SM 123. The switch 313b is configured of an NMOS transistor in which the gate is connected to the row scanning line g, the drain is connected to the column data line db, and the source is connected to the other input terminal of the SM 123.

The SM 123 is a self-holding memory formed of two inverters 323 and 324 in which an output terminal of one inverter is connected to an input terminal of the other inverter. In the inverter 323, the input terminal is connected to the output terminal of the inverter 324, the source of the NMOS transistor configuring the switch 313a, and the switch 314a. In the inverter 324, the input terminal is connected to the output terminal of the inverter 323, the source of the NMOS transistor configuring the switch 313b, and the switch 314b. Both of the inverters 323 and 324 are in a publicly known CMOS inverter configuration as illustrated in FIG. 3.

Moreover, the switch 314a is configured of an NMOS transistor in which the gate is connected to the trigger line trig, the drain is connected to the connecting point between the SM 123 and the switch 313a, and the source is connected to one input terminal of the SM 124. The switch 314b is configured of an NMOS transistor in which the gate is connected to the trigger line trig, the drain is connected to the connecting point between the SM 123 and the switch 313b, and the source is connected to the other input terminal of the SM 124.

Furthermore, the SM 124 is a self-holding memory formed of two inverters 325 and 326 in which an output terminal of one inverter is connected to an input terminal of the other inverter. In the inverter 325, the input terminal is connected to the output terminal of the inverter 326, the source of the NMOS transistor configuring 314a, and a reflecting electrode 401. In the inverter 326, the input terminal is connected to the output terminal of the inverter 325 and the source of the NMOS transistor configuring the switch 314b. Both of the inverters 325 and 326 are in a publicly known CMOS inverter configuration as illustrated in FIG. 3 similarly to the inverters 323 and 324.

The pixel 12B according to the second embodiment performs the operations similar to the operations described with reference to the timing chart in FIG. 5. In the pixel 12B, when a selection is made by the row scanning signal, the switches 313a and 313b are turned on. One bit of normal subframe data and one bit of reverse subframe data having inverted logical values to each other are supplied to the switches 313a and 313b through the column data line d and the column data line db. Here, the switches 313a and 313b are configured of NMOS transistors, in which normal subframe data and reverse subframe data at a voltage on the VDD side ("H") are not input due to the threshold voltage Vth of the NMOS transistor, and are input at a voltage lower than the VDD by the Vth. In addition, an electric current hardly flows at this voltage. Thus, normal subframe data or reverse subframe data at a GND potential ("L") sampled by the switch 313a or 313b is written into the SM 123.

Data is written to the SM 124 by the switches 314a and 314b controlled by the trigger pulse supplied through the trigger line trig. Data supplied from the connecting point between the SM 123 and the switch 313a to the switch 314a through an interconnection 600 and data supplied from the connecting point between the SM 123 and the switch 313b to the switch 314b through an interconnection 600b are in the relation of the inverted logical values. The switches 314a and 314b are configured of NMOS transistors, in which the voltage on the VDD side (at "H" level) is not input due to the Vth of the NMOS transistor, and only a voltage lower than the VDD by the Vth is input. In addition, since the switches 314a and 314b are driven near the Vth of the NMOS transistor, an electric current hardly flows at this voltage. Thus, data on the interconnection 600 or on the interconnection 600b at the GND potential (at "L" level) is written into the SM 124.

Here, it is necessary to rewrite data on the SM 124 with data stored on the SM 123 when the trigger pulse at "H"

level is input through the trigger line trig immediately after subframe data is written into the SMs 123 of all the pixels 12B configuring the image display unit 11. In other words, data on the SM 123 does not have to be rewritten with data stored on the SM 124. Thus, it is necessary to reduce the driving forces of the inverters configuring the SM 124 smaller than the driving forces of the inverters configuring the SM 123. In other words, in the case where data stored on the SM 123 and the SM 124 are different from each other, the output data of the inverter 323 collides against the output data of the inverter 325 when the trigger pulse at "H" level is input; and thus it is necessary to increase the driving force of the inverter 323 more than the driving force of the inverter 325 in such a way that data on the inverter 326 is reliably rewritten with the output data of the inverter 323. Moreover, in the relation between the inverter 324 and the inverter 326, it is necessary to increase the driving force of the inverter 324 more than the driving force of the inverter 326 in such a way that data on the inverter 325 is reliably rewritten with the output data of the inverter 324.

Figure 8:
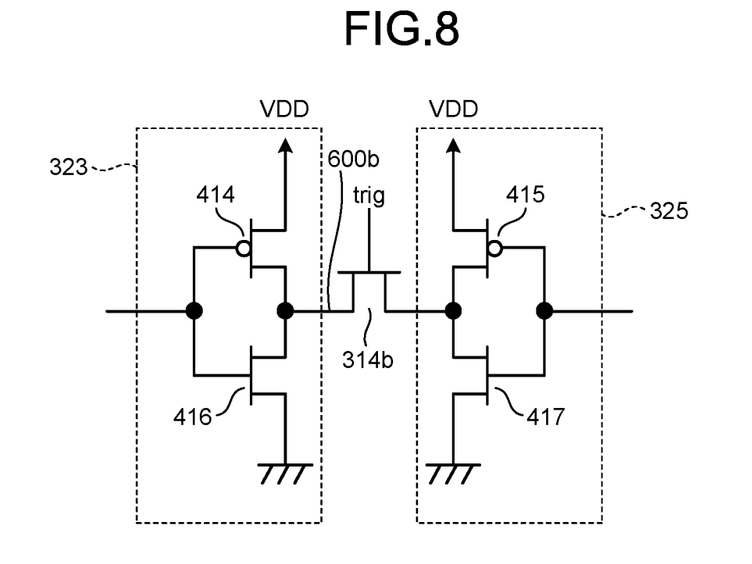
FIG. 8 is a diagram illustrative of the sizes of driving force between inverters forming two SRAMs according to the second embodiment in FIG. 7.

This will be further described with reference to FIG. 8. For briefly describing the relation between the inverter 323 and the inverter 325, in the case where the output data of the SM 123 on the interconnection 600b is at "H" level, a P-MOS transistor 414 configuring the inverter 323 is in the ON-state. On the other hand, in the case where the output data of the SM 124 on the interconnection 600b side is already at "L" level, an NMOS transistor 417 configuring the inverter 325 is in the ON-state.

At this time, in the case where the NMOS transistor configuring the switch 314b is turned on due to the trigger pulse at "H" level on the trigger pulse line trig and the outputs of the inverter 323 and the inverter 325 are conducted to each other, an electric current flows from the VDD to the GND through the P-MOS transistor 414 of the inverter 323 and the NMOS transistor 417 of the inverter 325. At this time, the voltage of the interconnection 600b is determined by the ratio of the ON-resistance between the P-MOS transistor 414 and the NMOS transistor 417.

On the contrary, in the case where the output data of the SM 123 on the interconnection 600b is at "L" level and the output data of the SM 124 on the interconnection 600b side is already at "H" level, when the NMOS transistor configuring the switch 314b is turned on due to the trigger pulse at "H" level on the trigger pulse line trig and the outputs of the inverter 323 and the inverter 325 are conducted to each other, an electric current flows from the VDD to the GND through a P-MOS transistor 415 of the inverter 325 and an NMOS transistor 416 of the inverter 323. At this time, the voltage of the interconnection 600b is determined by the ratio of the ON-resistance between the P-MOS transistor 415 and the NMOS transistor 416.

Moreover, the input gate of the inverter 326, not illustrated, is connected to the interconnection 600b, and the output data of the inverter 326 is fixed to "L" level or "H" level due to the input of the voltage level of the interconnection 600b. In other words, since the output data of the SM 124 is determined by the voltage level of the interconnection 600b, it is necessary that the ON-resistance of the transistors of the inverter 323 and the inverter 324 be lower than the ON-resistance of the transistors of the inverter 325 and the inverter 326 in order to rewrite data on the SM 124 with the output data of the SM 123. The ON-resistance of the transistors of the inverter 323 and the inverter 324 is low, so that data on the SM 124 can be reliably rewritten with the output data of the SM 123 regardless of the data level of the SM 124.

The use of a transistor with low ON-resistance can be implemented by using a transistor with high driving force, and can be implemented by reducing the gate length or increasing the gate width.

When one bit of data stored on the SM 123 is simultaneously written to the SMs 124 of all the pixels 12B in the image display unit 11, the trigger pulse on the trigger pulse line trig is turned at "L" level, and the switches 314a and 314b are turned off. Thus, the SM 124 holds one bit of written data, and the potential of the reflecting electrode 401 can be fixed to the potential according to the held data for a given period (one subframe period here).

Data written to the SM 124 is normal data and inverted data switched for every one subframe illustrated in the chart 502 in FIG. 5; on the other hand, the common electrode potential Vcom is also alternately switched to a predetermined potential for every one subframe in synchronization with the write described above, as illustrated in the chart 503 in FIG. 5. Thus, in accordance with the liquid crystal display device using the pixel 12B according to the second embodiment, similarly to the liquid crystal display device using the pixel 12A according to the first embodiment, alternating drive is performed in which the direction of the potential is reversed for every subframe, so that display in which the burn-in of the liquid crystals 402 can be prevented. Moreover, in accordance with the liquid crystal display device using the pixel 12B according to the second embodiment, the driving forces of the inverters 323 and 324 configuring the SM 123, the driving forces of the inverters 325 and 326 configuring the SM 124, and the driving forces of the transistors configuring the switches 313a, 313b, 314a and 314b are set in a predetermined relation, so that stable and accurate gradation display can be performed.

It is noted that the switches 313a, 313b, 314a and 314b may be configured of P-MOS transistors. In this case, it is considered that the polarity is reversed in the description above, and the detail is omitted.

Figure 9:
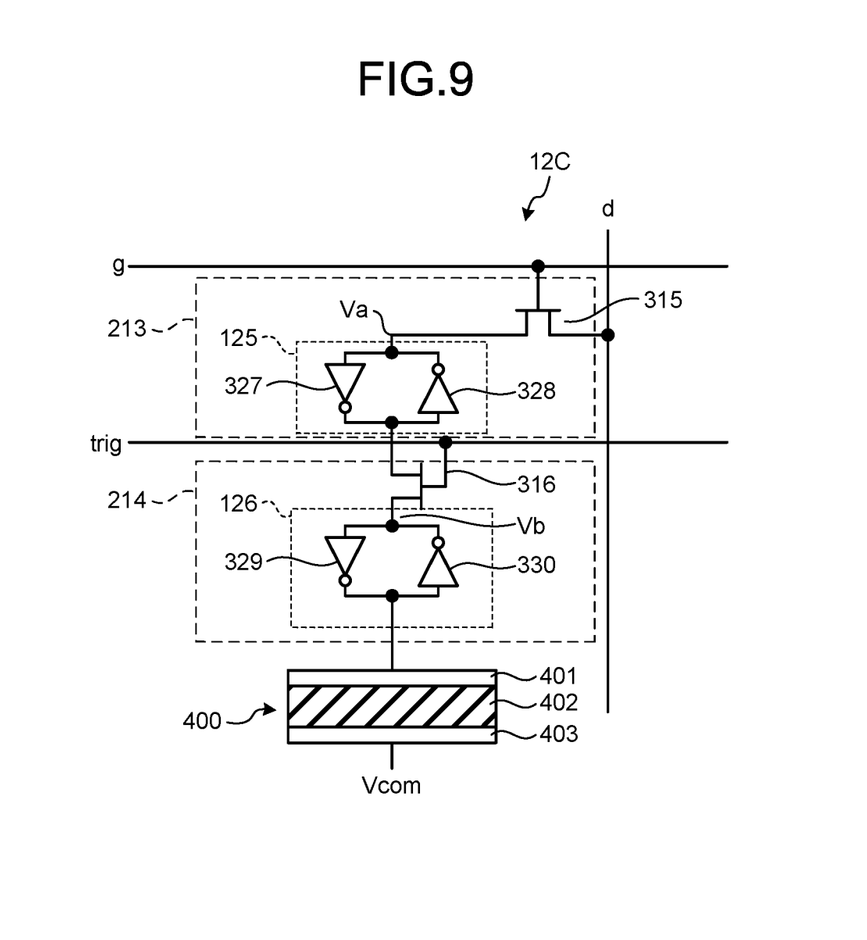
FIG. 9 is a circuit diagram of a pixel according to a third embodiment.

Next, a pixel, which is the essential part of a liquid crystal display device according to a third embodiment, will be described. FIG. 9 is a circuit diagram of a pixel, which is the essential part of a liquid crystal display device according to the third embodiment. In FIG. 9, the same reference numerals and signs are designated to the same components in FIG. 7, and the descriptions thereabout are omitted.

In FIG. 9, a pixel 12C according to the third embodiment is a pixel provided at the intersecting portion of a given column data line d in the column data lines $d_1$ to $d_n$ in which one end of the column data line is connected to the level shifter/pixel driver 163 in FIG. 1 and the column data line extends in the column direction (in the Y-direction) and a given row scanning line g in which one end of the row scanning line g is connected to the vertical shift register 14 and the row scanning line g extends in the row direction (in the X-direction). The pixel 12C is configured to include a first static random access memory (SRAM) 213, a second static random access memory (SRAM) 214, and a liquid crystal display element 400. The first SRAM 213 is configured to include a switch 315 configuring a first switching unit and a first signal holding unit (SM) 125. Moreover, the second SRAM 214 is configured to include a switch 316 configuring a second switching unit and a second signal holding unit (SM) 126. The pixel 12C according to the embodiment is configured of SRAMs in two stages similarly to the pixel 12B. However, it is characterized in that the write to the SM 125 in the SRAM 213 and the SM 126 in the SRAM 214 is performed using the switches 315 and 316, respectively.

The switch 315 is configured of an NMOS transistor in which the gate is connected to the row scanning line g, the drain is connected to the column data line d, and the source is connected to one input terminal of the SM 125. The SM 125 is a self-holding memory formed of two inverters 327 and 328 in which an output terminal of one inverter is connected to an input terminal of the other inverter. In the inverter 327, the input terminal is connected to the output terminal of the inverter 328 and the source of the NMOS transistor configuring the switch 315. In the inverter 328, the input terminal is connected to the output terminal of the inverter 327 and the drain of the NMOS transistor configuring 316. Both of the inverters 327 and 328 are in a publicly known CMOS inverter configuration as illustrated in FIG. 3.

Moreover, the switch 316 is configured of an NMOS transistor in which the gate is connected to the trigger line trig, the drain is connected to the output terminal of the SM 125, and the source is connected to the input terminal of the SM 126. Furthermore, the SM 126 is a self-holding memory formed of two inverters 329 and 330 in which an output terminal of one inverter is connected to an input terminal of the other inverter. In the inverter 329, the input terminal is connected to the output terminal of the inverter 330 and a reflecting electrode 401. In the inverter 330, the input terminal is connected to the output terminal of the inverter 329 and the source of the NMOS transistor configuring the switch 316. Both of the inverters 329 and 330 are in a publicly known CMOS inverter configuration as illustrated in FIG. 3 similarly to the inverters 327 and 328.

The pixel 12C according to the embodiment performs the operations similar to the operations described with reference to the timing chart in FIG. 5. In the pixel 12C, when a selection is made by the row scanning signal, the switch 315 is turned on, and normal subframe data, which is output to the column data line d when the switch 315 is turned on, is sampled by the switch 315, and written into the SM 125 of the pixel 12C. In the following, similarly, the normal subframe data is written into the SMs 125 of all the pixels 12C configuring the image display unit 11; and after the write operation is finished, the trigger pulse at "H" level is simultaneously supplied to all the pixels 12C configuring the image display unit 11. Thus, since the switches 316 of all the pixels 12C are turned on, the normal subframe data stored on the SM 125 is simultaneously transferred and held on the SM 126 through the switches 316, and is applied to the reflecting electrode 401. The holding period of the normal subframe data on the SM 126 is one subframe period until the subsequent "H" trigger pulse is input into the trigger line trig.

Subsequently, similarly to the description above, the pixels 12C in the image display unit 11 are selected in units of rows by the row scanning signal, and reverse subframe data having the inverted logical value to normal subframe data immediately before is written to the SM 125 for the individual pixels. After the write of reverse subframe data to the SMs 125 of all the pixels 12C configuring the image display unit 11, the trigger pulse at "H" level is simultaneously supplied to all the pixels 12C configuring the image display unit 11. Thus, since the switches 316 of all the pixels 12C are turned on, the reverse subframe data stored on the SM 125 is simultaneously transferred and held on the SM 126 through the switches 316, and is applied to the reflecting electrode 401. The holding period of the reverse subframe data on the SM 126 is one subframe period until the subsequent "H" trigger pulse is input to the trigger line trig.

Data is written to the SM 125 by the input from a single switch 315 as described above. In this case, the transistor, which is in the inverter 327 on the input side configuring the SM 125 when seen from the switch 315, is formed of a transistor whose driving force is larger than the driving force of the transistor in the inverter 328 on the output side configuring the SM 125. Moreover, the driving force of the NMOS transistor configuring the switch 315 is larger than the driving force of the NMOS transistor configuring the inverter 328. This is because of the similar reason for the relation between the driving forces of the inverters 321 and 322 and the switch 311 in the pixel 12A described above, and the description thereabout is omitted.

Furthermore, data is written to the SM 126 through a single switch 316. In this case, the transistor, which is in the inverter 329 on the input side configuring the SM 126 when seen from the switch 316, uses a transistor with large driving force, and the transistor, which is in the inverter 330 on the output side configuring the SM 126 when seen from the switch 316, uses a transistor with small driving force.

With this configuration, in the case where the trigger pulse is turned at "H" level and the switch 316 is turned on, when data stored on the SM 125 and the SM 126 are different from each other, the output data of the inverter 327 collides against the output data of the inverter 330. On the other hand, the driving force of the inverter 327 is larger than the driving force of the inverter 330, so that data on the SM 126 can be rewritten with data on the SM 125 while preventing data on the SM 125 be rewritten with data on the SM 126.

Moreover, the driving force of the NMOS transistor configuring the switch 316 is larger than the driving force of the NMOS transistor configuring the inverter 330. This is because it is necessary to increase the voltage Vb more than the threshold voltage at which the inverter 329 is inverted in the case where data on the SM 126 is rewritten, more specifically, in the case where the voltage Vb on the input side on the switch 316 side of the SM 126 is at "L" level and data on the SM 125 is at "H" level.

Namely, the voltage Vb is determined according to the ratio between the electric current of the NMOS transistor configuring the inverter 330 and the electric current on the switch 316. At this time, since the switch 316 is an NMOS transistor, the voltage on the VDD side is not input due to the threshold Vth of the NMOS transistor, and the voltage at "H" level becomes a voltage lower than the VDD by the Vth. In addition, since the switch 316 is driven near the Vth of the NMOS transistor, an electric current hardly flows at this voltage. In other words, the higher the voltage Vb conducted through the input switch 316 is, the smaller the electric current caused to flow at the switch 316 is. In other words, in order that the voltage Vb reaches the threshold voltage or more at which the inverter 329 on the input side of the SM 126 is inverted at "H" level, it is necessary that the electric current carried through the switch 316 be larger than the electric current carried through the NMOS transistor configuring the inverter 330. It is necessary to determine the transistor size of the switch 316 and the transistor size of the NMOS transistor configuring the inverter 330 in consideration of the ratio of the driving force.

When one bit of data stored on the SM 125 is simultaneously written to the SMs 126 of all the pixels 12C, the trigger pulse on the trigger pulse line trig is turned at "L" level, and the switch 316 is turned off. Thus, the SM 126 holds one bit of written data, and the potential of the reflecting electrode 401 can be fixed to the potential according to the held data for a given period (one subframe period here).

Data written to the SM 126 is normal data and inverted data switched for every one subframe as illustrated in the chart 502 in FIG. 5. On the other hand, the common electrode potential Vcom is also alternately switched to a predetermined potential for every one subframe in synchronization with the write described above as illustrated in the chart 503 in FIG. 5. Therefore, in accordance with the liquid crystal display device using the pixel 12C according to the third embodiment, alternating drive is performed in which the direction of the potential of the liquid crystals 402 is reversed for every subframe, so that display, in which the burn-in of the liquid crystals 402 is prevented, can be performed similarly to the liquid crystal display device using the pixel 12A or 12B according to the embodiments. Moreover, in the liquid crystal display device using the pixel 12C according to the third embodiment, the driving forces of the inverters 327 and 328 configuring the SM 125, the driving forces of the inverters 329 and 330 configuring the SM 126, and the driving forces of the transistors configuring the switch 315 and 316 are set in a predetermined relation, so that stable and accurate gradation display can be performed.

It is noted that the switch 315 and 316 may be configured of P-MOS transistors. In this case, it is considered as the polarity being reversed to the corresponding description above, and the detail thereabout is omitted.

It is noted that the present invention is not limited to the embodiments above; and for example, the pixel electrode is described as the reflecting electrode 401, however, the pixel electrode may be a transmissive electrode.

According to the present invention, it is possible to downsize a pixel as compared with a prior art liquid crystal display device using two SRAMs in a pixel. Moreover, according to the present invention, even in the case where two SRAMs are provided in a pixel, it is possible to perform stable operations as compared with a prior art liquid crystal display device.

What is claimed is:

1. A liquid crystal display device comprising:
a plurality of pixels individually provided at an intersecting portion at which a plurality of column data lines intersects with a plurality of row scanning lines,
each of the pixels individually including:
  a display element configured to have liquid crystals filled and sealed between a pixel electrode and a common electrode opposing to each other;
  a first switching unit configured to sample subframe data for displaying every frame of a video signal in a plurality of subframes having a display period shorter than one frame period of the video signal through the column data line;
  a first signal holding unit configured to form a static random access memory together with the first switching unit and configured to store the subframe data sampled by the first switching unit, one first signal holding unit being provided for one display element;
  a second switching unit configured to output the subframe data stored in the first signal holding unit; and
  a second signal holding unit configured to form a dynamic random access memory together with the second switching unit, in which stored content is rewritten with the subframe data stored in the first signal holding unit supplied through the second switching unit, and configured to apply output data to the pixel electrode, the second switching unit comprising two transistors, a source of each of the two transistors being connected to an output terminal of the static random access memory, a drain of each of the two transistors being connected to the pixel electrode, and a gate of each of the two transistors being controlled by a different trigger pulse; and
a pixel control unit configured to perform, for individual subframes, operations of:
  after writing into all of the plurality of pixels, which configures an image display unit, by repeatedly writing the subframe data to the first signal holding unit for the individual pixels in units of rows;
  turning on the second switching units in all of the plurality of pixels with the two different trigger pulses for the two transistors; and
  rewriting stored content in the second signal holding units of the plurality of pixels with the subframe data stored in the first signal holding unit.

2. The liquid crystal display device according to claim 1, wherein
the second signal holding unit comprises a capacitance;
each of the static random access memory and the dynamic random access memory stores one bit data for one pixel;
the second switching unit comprises a transmission gate of a NMOS transistor and a P-MOS transistor;
one of the two different trigger pulses is a normal trigger pulse and the other of the two different trigger pulses is an inverted trigger pulse which have reverse polarities to each other; and
the NMOS transistor is controlled by the normal trigger pulse and the P-MOS transistor is controlled by the inverted trigger pulse.

* * * * *